United States Patent
Testerman et al.

(10) Patent No.: US 10,915,655 B2
(45) Date of Patent: Feb. 9, 2021

(54) BROWSER DRAG AND DROP FILE UPLOAD ENCRYPTION ENFORCEMENT

(71) Applicant: Dell Products L.P., Round Rock, TX (US)

(72) Inventors: James D. Testerman, McKinney, TX (US); James M. Burke, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 15/499,253

(22) Filed: Apr. 27, 2017

(65) Prior Publication Data

US 2018/0314844 A1 Nov. 1, 2018

(51) Int. Cl.
*G06F 21/62* (2013.01)

(52) U.S. Cl.
CPC .............................. *G06F 21/6236* (2013.01)

(58) Field of Classification Search
CPC ......... G06F 21/6209; G06F 2221/2149; G06F 21/6236; G06F 16/183; G06F 16/188; G06F 16/972; G06F 2221/2107; G06F 3/0486; H04L 63/0428; H04L 63/10; H04L 67/06

See application file for complete search history.

(56) References Cited

U.S. PATENT DOCUMENTS

| | | | | |
|---|---|---|---|---|
| 7,640,409 B1 * | 12/2009 | Stafford | ................ | G06F 3/0605 707/999.202 |
| 8,542,823 B1 * | 9/2013 | Nguyen | .............. | G06F 21/6218 380/42 |
| 9,110,963 B2 | 8/2015 | Burchett et al. | | |
| 2003/0191938 A1 * | 10/2003 | Woods | ................ | G06F 21/6209 713/165 |
| 2004/0003289 A1 * | 1/2004 | Bhogal | ............... | G06F 21/6245 726/28 |
| 2005/0169073 A1 * | 8/2005 | Cook | .................. | G06F 9/44584 365/202 |
| 2006/0184540 A1 * | 8/2006 | Kung | ..................... | G06Q 10/10 |
| 2008/0184148 A1 * | 7/2008 | Selig | ...................... | G06F 17/243 715/769 |
| 2009/0249460 A1 * | 10/2009 | Fitzgerald | ............... | G06F 21/88 726/7 |
| 2010/0250892 A1 * | 9/2010 | Logan | ................... | G06F 9/5077 711/173 |
| 2010/0318997 A1 * | 12/2010 | Li | ....................... | G06F 9/45558 718/104 |

(Continued)

FOREIGN PATENT DOCUMENTS

| | | | | |
|---|---|---|---|---|
| CN | 104318179 A | * | 1/2015 | |
| EP | 3179701 A1 | * | 6/2017 | ............. H04L 67/22 |

*Primary Examiner* — Chau Le
*Assistant Examiner* — Han Yang
(74) *Attorney, Agent, or Firm* — Norton Rose Fulbright US LLP

(57) ABSTRACT

Some websites accessed via browser allow for file uploading via drag and drop functionality. In a drag and drop operation, a user selects a file on the information handling system and drags the file to a browser window for uploading via the browser. File encryption systems, such as virtual file systems, may implement an encryption algorithm and enforce encryption standards, set by a user or organization, when uploading files via a browser, including uploading of files performed via file drag and drop functionality.

20 Claims, 2 Drawing Sheets

(56) References Cited

U.S. PATENT DOCUMENTS

| | | | | |
|---|---|---|---|---|
| 2012/0173655 A1* | 7/2012 | McEntee | ............. | H04L 67/1097 709/216 |
| 2013/0268545 A1* | 10/2013 | Burchett | ............... | G06F 16/258 707/754 |
| 2013/0305039 A1* | 11/2013 | Gauda | ................. | G06F 21/6218 713/153 |
| 2015/0324146 A1* | 11/2015 | Xiao | ....................... | G06F 21/53 711/112 |
| 2016/0132528 A1* | 5/2016 | Roubaud | ................. | G06F 9/451 707/626 |
| 2017/0171295 A1* | 6/2017 | Sung | ....................... | H04L 67/22 |
| 2018/0232396 A1* | 8/2018 | Arab Roubaud | ....... | G06F 9/451 |

* cited by examiner

BROWSER DRAG AND DROP FILE UPLOAD ENCRYPTION ENFORCEMENT

FIELD OF THE DISCLOSURE

The instant disclosure relates to file management on information handling systems. More specifically, portions of this disclosure relate to encryption of files uploaded from information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Along with the increasing value and use of information, the importance of security of information processed, compiled, stored, and/or communicated by information handling systems has increased. Information handling systems may be configured to implement encryption systems to encrypt files containing information before storing and/or transmitting files in order to enhance information security.

Users of information handling systems may use applications, such as web browsers, to upload and download files to and from the internet. When users upload files through browsers, the files may become accessible to others. For example, uploading files to a cloud storage provider provides that provider with access to the files' contents. Although the files may be protected from unintended views on a user's computer, the files' security is not guaranteed by the cloud storage provider. Thus, additional safeguards are needed to secure the files against loss of security during uploading using web browsers or other applications.

Shortcomings mentioned here are only representative and are included simply to highlight that a need exists for improved information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Many users of information handling systems use applications to create, manage, and/or save files containing information. Encryption functionality of information handling systems may be designed to operate in the background with minimal user input. Encryption of the files secures the data against access by unintended recipients. Thus, improving the handling of encrypted files encourages a user to keep their data secure. One background technique is to direct file access through encryption systems, such as virtual file systems, which apply encryption and decryption without changing the user's workflow.

One application that may be used to transmit and receive files is the browser. Browsers are used to access websites from which files may be downloaded and to which files may be uploaded. Some websites allow users to upload files to be stored at a remote location, such as on a server at a data center, or to transmit their files to other information handling systems operated by other users. The security of information contained in uploaded files is important because of the public nature of the Internet and because the remote systems may be operated by people who should not have access to the contents of the uploaded files.

Some websites accessed via browser allow for file uploading via drag and drop functionality. In a drag and drop operation, a user selects a file on the information handling system and drags the file to a browser window for uploading via the browser. File encryption systems, such as virtual file systems, may implement an encryption algorithm and enforce encryption standards, set by a user or organization, when uploading files via a browser, including uploading of files performed via file drag and drop functionality. The encryption algorithm may be implemented in a transformer module, such as described in U.S. Pat. No. 9,110,963 to Burchett et al. and entitled "TRANSPARENT ADAPTIVE FILE TRANSFORM," which is hereby incorporated by reference.

A drag and drop operation involving an unencrypted file may be prevented to preserve security of the content of the file. When a user engages drag and drop functionality of a browser by dragging a file to a browser window and dropping the file on a drag and drop area of the browser window, a browser drag and drop upload request for the file may be detected by an operating system (OS) level service. When the request is detected, the system determines whether at least part of the file to be uploaded is encrypted or whether the file to be uploaded is unencrypted. If the file is unencrypted, the browser may be prevented from retrieving the unencrypted file. The system may prevent the browser from retrieving the unencrypted file by hiding the unencrypted file from the browser. If the browser is unable to retrieve the file, the browser may instruct a user, such as through display of a popup window, to encrypt the file prior to upload. For example, the browser may instruct the user to select the file through an open file dialog box of the browser. The dialog box may provide the user an option to apply encryption of the file through the virtual file system prior to upload. Alternatively, accessing the file through the dialog box may cause the encryption of the file to occur automatically using the virtual file system. If the dragged file is already encrypted, the browser may be allowed to retrieve the file normally.

A list of managed websites may be maintained and used to determine when to apply the drag and drop security. The browser, a browser plug-in, other application, or a system service may be configured to monitor websites accessed by a user for access of a managed site. The list of managed sites may be selected by a user or by an entity controlling the information handling system. The list may include websites to which the user or entity desires to prevent uploading of unencrypted files. When access of a managed site is detected, input/output file activity associated with the managed site may be checked to prevent upload of unencrypted files. In some embodiments, the drag and drop requests on a managed website may be directed through the virtual file system. The virtual file system can determine whether the files are encrypted or unencrypted. When file input/output activity for a managed site is directed through a virtual file system, detection of a browser drag and drop file upload request may include detecting, by the virtual file system, input/output file activity associated with the managed site indicating a browser drag and drop upload request for the file. Alternatively, all file input/output activity from the browser may be directed through a virtual file system, regardless of whether the activity is associated with a managed site. In such cases, detecting a browser drag and drop upload request for a file may include detecting, by the virtual file system, input/output file activity from the browser indicating the browser drag and drop upload request for the file.

A computer program product may contain code to perform steps for uploading files and verifying an encryption status of files to be uploaded similar to those described herein. The code may be stored on a non-transitory computer readable medium. An information handling system may include a processor configured to perform steps for uploading files similar to those described herein and a memory coupled to the processor.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Information handling systems may execute software for management of the information handled. Information may be generated and manipulated by applications executed on information handling systems and may be stored in data structures, such as files. Applications, such as browsers, may be used to transmit files, such as by uploading files to a remote location via a website. OS-level file management systems, such as virtual file systems, may manage, organize, and protect files. One way to protect files is to verify encryption of files prior to transmission via a browser. In order to enhance ease of use and information security, file encryption systems may be configured to verify encryption of files uploaded by users through various browser systems, such as browser drag and drop file upload functionality.

Figure 1:
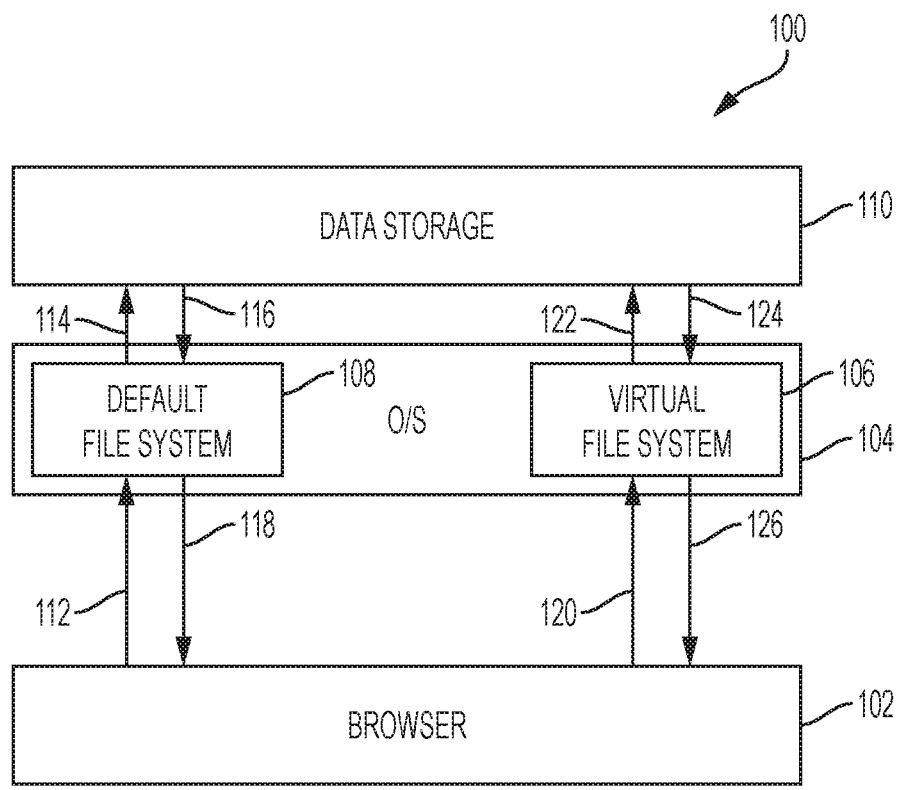
FIG. 1 is a block diagram illustrating a system for managing browser access of files through a virtual file system of an information handling system according to some embodiments of the disclosure.

A virtual file system may apply encryption and decryption algorithms to files either automatically or at the request of a user. The encryption and decryption algorithms may encrypt and decrypt portions of files or files in their entirety. A virtual file system may verify encryption of files uploaded via a browser. A system 100 for managing browser 102 access of files through implementation of a virtual file system 106 is shown in FIG. 1. When accessing files through a default file system 108 of an information handling system, a browser 102 may request access 112 to a file through the default file system 108 of the operating system 104. The default file system 108 may be a standard file system integrated into the operating system 104. The default file system may request 114 the file from a data storage 110, retrieve 116 the file from the data storage 110, and return 118 the file to the browser 102 for uploading. The data storage 110 may be a solid state drive, a hard drive, or other data storage device and may be local or may be a remotely accessed cloud storage. When a virtual file system 106 is implemented, file input/output from the browser 102 may be redirected from an access path, such as access path 112-118, through the default file system, to access path through the virtual file system 106, such as access path 120-126. A file access path, for example access path 112-118 or 120-126, may include a combination of virtual and/or physical busses through which data stored at a particular location in data storage may be accessed. A particular access path for accessing particular data may be activated by a corresponding address mapped to the particular access path. For example, when file input/output from the browser 102 is directed through the virtual file system 106, the browser 106 may access files to be uploaded via a file access path 120-126 that passes through the virtual file system 106. A file access path may be specified in a file access request from the browser. The virtual file system may determine whether a file for which access has been requested is encrypted or unencrypted by examining a file access path specified by the file access request or by examining the file itself. When the browser 102 requests access 120 to an unencrypted file, the virtual file system 106 may prevent the browser 102 from accessing the file. When a browser 102 requests access 120 to an encrypted file, a file that is at least partially encrypted, the virtual file system 106 may request 122 the file from the data storage 110 and the data storage 110 may return 124 the file to the virtual file system 106. The virtual file system 106 may then return 126 the file to the browser 102 for uploading.

A virtual file system may also be referred to as a call-back file system. A call-back file system can provide an extensible action pipeline that is applied to files dynamically as they are accessed from and saved to a data storage. For example, a call-back file system can be configured to allow an action or a combination of actions to be performed on a file in response to access of the file by an application. A data transform may be performed on a file in response to access of the file by an application and may include data compression and/or encryption. Data transforms may also include file-type transformation, rights management embedding, file name obfuscation, bulk upload, or a change of communications protocols. The call-back file system may also be configured to create a backup or a shadow copy of data accessed at a second location. The call-back file system may perform content filtering (e.g., removal of credit card or other personal or private data). The call-back file system may add or remove metadata. The call-back file system may be configured to add an entry to an audit log showing file activity. Various actions of the call-back file system may be set on an application-by-application basis, in response to the type of data access activity, in response to the content of the data being accessed, or the like. The call-back file system may be configured to perform file transform and record-keeping operations in the background with little input by a user. One example of a call-back system that may implement embodiments of the disclosed invention is given in U.S. Pat. No. 9,110,963.

Figure 2:
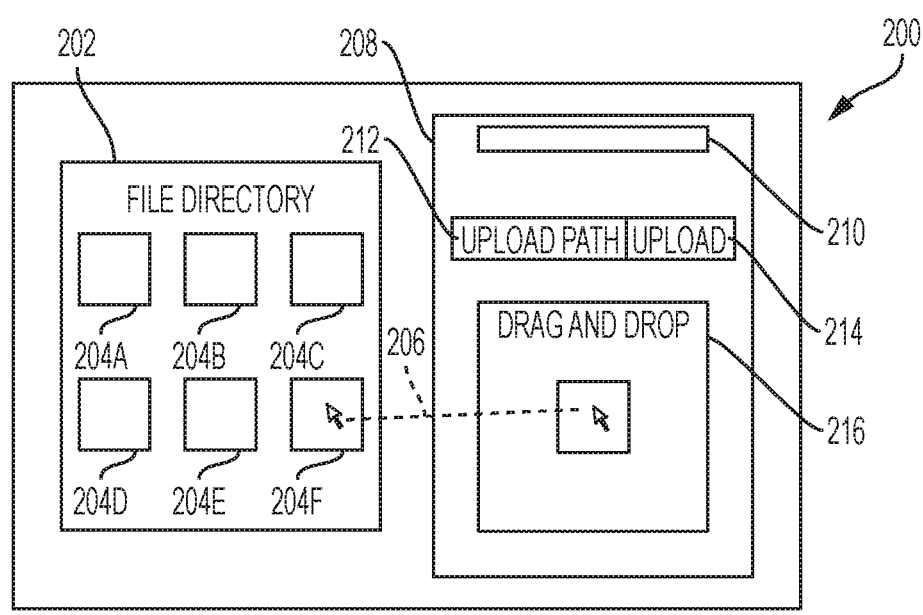
FIG. 2 is an illustration of a file drag and drop process for uploading a file via a browser according to some embodiments of the disclosure.

Files may be uploaded via a browser using browser drag and drop file upload functionality. FIG. 2 is an illustration of a file drag and drop upload process. A file directory window 202, or other graphical or text display of files 204A-F stored on an information handling system may be presented on a display 200. A browser 208 may be presented simultaneously on the display 200 or may be displayed subsequently to selection of files to be dragged and dropped. The browser 208 may include a Uniform Resource Locator (URL) box 210 for entering a URL for navigating to a web page. A web page accessed by the browser 208 may display a file upload button 214 that may initiate a file open dialog when selected by a user, allowing the user to select files to be uploaded and desired encryption options for the files. An access path for a file selected through the file open dialog may be displayed in the upload path box 212, when a user has selected a file through the open file dialog. A web page accessed by the browser 208 may also display a drag and drop file upload area 216 to allow a user to drag and drop files for uploading via the browser 208. A user may select one or more files from the directory window 202, or other display of files, and may drag 206 the files from the directory window 202, or other display of files, to the drag and drop area 216 and may drop the selected one or more files within the drag and drop area 216. A drag and drop operation may include clicking on one of the files 204A-F with a mouse button, holding the mouse button while dragging the file to the drop area 216, and then releasing the mouse button. Once the one or more files are dropped within the drag and drop area 216, the browser 208 may retrieve and upload the one or more files to the website.

Figure 3:
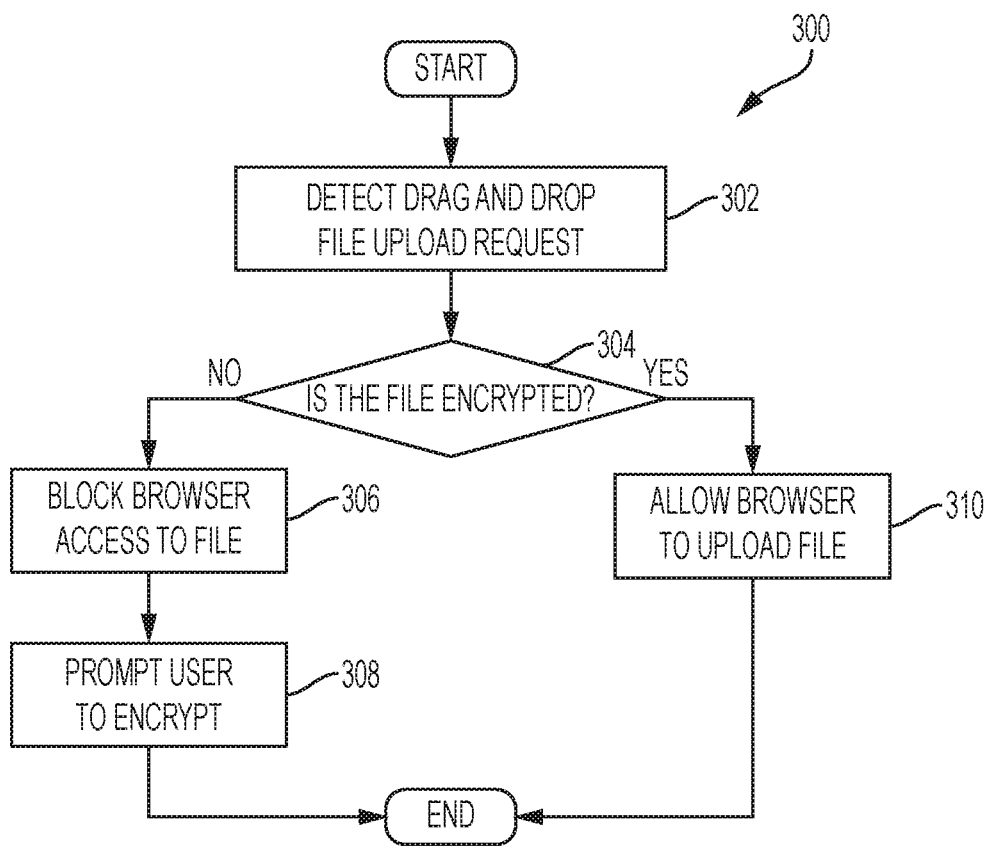
FIG. 3 is a flow chart illustrating an example method of verifying encryption of files uploaded via a browser drag and drop file upload process according to some embodiments of the disclosure.

A virtual file system may be configured to allow users to use drag and drop functionality of a browser to upload files. The virtual file system may verify that files to be uploaded via drag and drop functionality of the browser are encrypted prior to allowing the browser to retrieve and upload the files. FIG. 3 shows an example method 300 for verifying an encryption status of a file before allowing a browser to upload the file in response to a drag and drop file upload request. The method 300 may begin at step 302 with detection of a drag and drop file upload request. The drag and drop file upload request may be an operation performed by a user, dragging and dropping a file on a browser drag and drop window or it may be an operation of the browser or a browser plug-in attempting to retrieve or requesting access to the file in response to a user drag and drop operation. For example, the drag and drop file upload request may include input-output file activity from a browser or from a specific website accessed by the browser indicating a browser drag and drop upload request for a file. The request may be detected by the browser, a browser plug-in, or an OS-level process, such as a virtual file system. The request may be detected by examining an originating application identifier to determine a web browser is making the request.

When the drag and drop file upload request is detected, the system determines at step 304 whether the file to be uploaded is encrypted. The virtual file system may determine whether the file to be uploaded is encrypted by examining an access path to a file, as discussed with respect to FIG. 1, by examining parameters of the file itself, or by examining other parameters related to the file to be accessed. File encryption may be indicated by a file type of the file. For example, encrypted content may be contained within a file wrapper or include a cover page indicating that the file contains encrypted content. The virtual file system may examine a file type of the file to determine if the file type is an encrypted file type. Alternatively, the virtual file system may determine encryption status through examining other file features, such as file contents, a title of the file, an extension of the file, a header of the file, and/or metadata stored in the file. Each of these characteristics are examples intelligently determining whether a file is protected by the virtual file system or not. If the file is not at least partially encrypted, browser access to the file may be blocked to prevent the browser from retrieving the unencrypted file at step 306. The virtual file system may hide the file from the browser so that the browser is unable to retrieve the dragged file. For example, when the browser requests retrieval of a file from the virtual file system, the virtual file system may inform the browser that the file cannot be accessed or does not exist. When the browser is unable to find the file it has been instructed to upload, the browser may display a message to a user stating that the file does not exist. In some embodiments, the browser may display a message at step 308 instructing the user to encrypt and upload the file via an open file dialog of the browser instead of the file drag and drop upload functionality. If the file is determined to be encrypted at step 310 the browser may be allowed to retrieve the file at block 310 through the virtual file system and upload the file via the website in response to the drag and drop file upload request.

File traffic from a web browser may be directed through the virtual file system to allow the virtual file system to detect file upload requests and verify encryption status of files to be uploaded. An example method 400 for directing traffic from a website through a virtual file system is discussed with respect to FIG. 4. The method 400 may begin, at step 402 with detection of browser navigation to a managed website. A browser, browser plug-in, other application, or OS-level process may have a list of managed websites and may monitor for browser access of the sites on the list. Encryption requirements for managed websites may be determined on a site-by-site basis. For example, the virtual file system may allow uploading of unencrypted files, through a drag and drop file upload process or through a file open dialog, via a trusted site while requiring encryption of files uploaded via other websites. The virtual file system may require specific forms of encryption for files uploaded to specific sites and may block browser drag and drop access to files that do not meet encryption standards. The virtual file system may require alternative or additional information security measures such as meta-data scrubbing or removal of personal information from files to be uploaded. Access of a managed site may be detected, and file input/output activity from the managed site may be directed at step 404 through the virtual file system. In some embodiments, the browser traffic may be redirected from a default file system to the virtual file system. The direction of file traffic through the virtual file system may be performed by the browser, the browser plug-in, other application, or an operating system-level service such as the virtual file system. Alternatively, all browser file activity from all sites may be redirected through the virtual file system for verification of file encryption status. For example, as discussed with respect to FIG. 1, file input/output activity from the browser 102 may be redirected from accessing files stored in data storage 110 through the default file system 108 to accessing the files through the virtual file system 106. Although the virtual file system is described as performing the security enforcement in examples provided above, an applications or OS-level service may implement the security enforcement.

Figure 4:
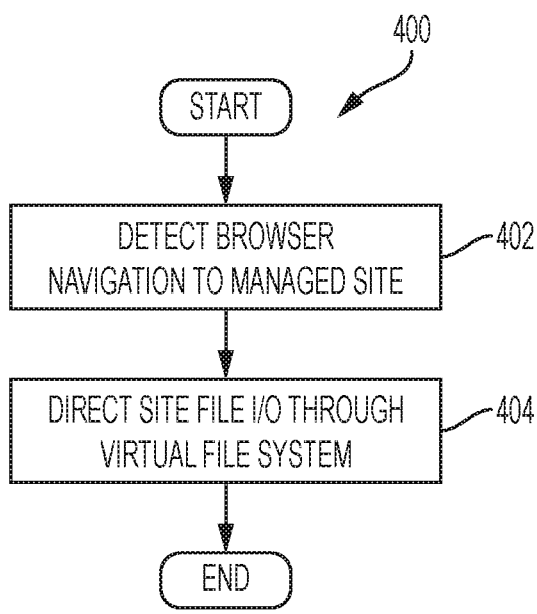
FIG. 4 is a flow chart illustrating an example method of directing browser input/output file activity through a virtual file system when browser access of a managed site is detected according to some embodiments of the disclosure.

The schematic flow chart diagrams of FIGS. 3-4 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for enforcing security on an information handling system, the method comprising:
   detecting a browser drag and drop request to access a file stored at a location in a data storage, through a default file system of an operating system of the information handling system, for uploading;
   redirecting the browser drag and drop request for the file from the default file system of the operating system of the information handling system to a virtual file system to access the file stored at the location in the data storage through the virtual file system, wherein the location in the data storage is the same before and after redirection of the browser drag and drop request;
   determining whether the file is unencrypted or encrypted;

when the file is unencrypted, preventing the browser from retrieving the unencrypted file; and when the file is encrypted, allowing the browser to retrieve the file for uploading.

2. The method of claim 1, wherein the step of preventing comprises hiding the file from the browser, and wherein hiding the file from the browser comprises notifying, by the virtual file system, the browser that the file does not exist.

3. The method of claim 1, further comprising instructing a user to encrypt the file prior to uploading when the file is unencrypted.

4. The method of claim 1, further comprising:
detecting, by a browser plug-in, browser access of a managed site; and
directing input/output file activity associated with the managed site through the virtual file system.

5. The method of claim 4, wherein the step of detecting a browser drag and drop upload request for a file comprises detecting, by the virtual file system, input-output file activity associated with the managed site indicating the browser drag and drop upload request for the file.

6. The method of claim 1, further comprising directing input/output file activity of the browser through the virtual file system, and wherein the step of detecting a browser drag and drop upload request for a file comprises detecting, by the virtual file system, input-output file activity from the browser indicating the browser drag and drop upload request for the file.

7. The method of claim 1, wherein the step of determining that at least part of the file is encrypted comprises reading metadata from the file to determine whether the file is encrypted.

8. A computer program product for implementation on an information handling system, comprising:
a non-transitory computer readable medium comprising code to perform steps comprising:
detecting a browser drag and drop request to access a file stored at a location in a data storage, through a default file system of an operating system of the information handling system, for uploading;
redirecting the browser drag and drop request for the file from the default file system of the operating system of the information handling system to a virtual file system to access the file stored at the location in the data storage through the virtual file system, wherein the location in the data storage is the same before and after redirection of the browser drag and drop request;
determining whether the file is unencrypted or encrypted;
when the file is unencrypted, preventing the browser from retrieving the unencrypted file; and
when the file is encrypted, allowing the browser to retrieve the file for uploading.

9. The computer program product of claim 8, wherein the step of preventing comprises hiding the file from the browser, and wherein hiding the file from the browser comprises notifying, by the virtual file system, the browser that the file does not exist.

10. The computer program product of claim 8, wherein the non-transitory computer readable medium comprises code to perform steps further comprising further comprising instructing a user to encrypt the file prior to uploading, when the file is unencrypted.

11. The computer program product of claim 8, wherein the non-transitory computer readable medium comprises code to perform steps further comprising:

detecting, by a browser plug-in, browser access of a managed site; and
directing input/output file activity associated with the managed site through the virtual file system.

12. The computer program product of claim 11, wherein the step of detecting a browser drag and drop upload request for a file comprises detecting, by the virtual file system, input-output file activity associated with the managed site indicating the browser drag and drop upload request for the file.

13. The computer program product of claim 8, wherein the non-transitory computer readable medium comprises code to perform steps further comprising directing input/output file activity of the browser through the virtual file system, and wherein the step of detecting a browser drag and drop upload request for a file comprises detecting, by the virtual file system, input-output file activity from the browser indicating the browser drag and drop upload request for the file.

14. The computer program product of claim 8, wherein the step of determining that at least part of the file is encrypted comprises reading metadata from the file to determine whether the file is encrypted.

15. An information handling system, comprising:
a processor; and
a memory coupled to the processor, wherein the processor is configured to perform steps comprising:
detecting a browser drag and drop request to access a file stored at a location in a data storage, through a default file system of an operating system of the information handling system, for uploading;
redirecting the browser drag and drop request for the file from the default file system of the operating system of the information handling system to a virtual file system to access the file stored at the location in the data storage through the virtual file system wherein the location in the data storage is the same before and after redirection of the browser drag and drop request;
determining whether the file is unencrypted or encrypted;
when the file is unencrypted, preventing the browser from retrieving the unencrypted file; and
when the file is encrypted, allowing the browser to retrieve the file for uploading.

16. The information handling system of claim 15, wherein the step of preventing comprises hiding the file from the browser, and wherein hiding the file from the browser comprises notifying the browser that the file does not exist.

17. The information handling system of claim 15, wherein the processor is configured to perform steps further comprising instructing a user to encrypt the file prior to uploading, when the file is unencrypted.

18. The information handling system of claim 15, wherein the processor is configured to perform steps further comprising:
detecting, by a browser plug-in, browser access of a managed site; and
directing input/output file activity associated with the managed site through the virtual file system.

19. The information handling system of claim 18, wherein the step of detecting a browser drag and drop upload request for a file comprises detecting, by the virtual file system, input-output file activity associated with the managed site indicating the browser drag and drop upload request for the file.

20. The information handling system of claim 15, wherein the step of determining that at least part of the file is encrypted comprises reading metadata from the file to determine whether the file is encrypted.

\* \* \* \* \*